United States Patent
Chen

(10) Patent No.: US 11,421,994 B2
(45) Date of Patent: Aug. 23, 2022

(54) METHOD AND APPARATUS FOR PARTITIONING ELECTRONIC FENCE

(71) Applicants: BEIJING JINGDONG SHANGKE INFORMATION TECHNOLOGY CO., LTD., Beijing (CN); BEIJING JINGDONG CENTURY TRADING CO., LTD., Beijing (CN)

(72) Inventor: Qingyu Chen, Beijing (CN)

(73) Assignees: BEIJING JINGDONG SHANGKE INFORMATION TECHNOLOGY CO., LTD., Beijing (CN); BEIJING JINGDONG CENTURY TRADING CO., LTD., Beijing (CN)

(*) Notice: Subject to any disclaimer, the term of this patent is extended or adjusted under 35 U.S.C. 154(b) by 409 days.

(21) Appl. No.: 16/641,947

(22) PCT Filed: Apr. 10, 2018

(86) PCT No.: PCT/CN2018/082425
§ 371 (c)(1),
(2) Date: Feb. 25, 2020

(87) PCT Pub. No.: WO2019/041817
PCT Pub. Date: Mar. 7, 2019

(65) Prior Publication Data
US 2020/0249030 A1 Aug. 6, 2020

(30) Foreign Application Priority Data
Aug. 30, 2017 (CN) .......................... 201710761781.X

(51) Int. Cl.
*G01C 21/30* (2006.01)
*G06F 16/909* (2019.01)
(Continued)

(52) U.S. Cl.
CPC .............. *G01C 21/30* (2013.01); *G06F 16/29* (2019.01); *G06F 16/909* (2019.01); *G08G 1/13* (2013.01); *G08G 1/207* (2013.01)

(58) Field of Classification Search
CPC ....... G01C 21/30; G06F 16/909; G06F 16/29; G08G 1/13; G08G 1/207
See application file for complete search history.

(56) References Cited

U.S. PATENT DOCUMENTS 5,838,330 A * 11/1998 Ajima .................... G06T 15/10
345/427
5,884,218 A * 3/1999 Nimura .................. G01C 21/36
701/428
(Continued)

FOREIGN PATENT DOCUMENTS

CN 103150768 A 6/2013
CN 103236091 A 8/2013
(Continued)

OTHER PUBLICATIONS

English translation of International Search Report and Written Opinion for Application No. PCT/CN2018/082425 dated May 30, 2018 (5 pages).

*Primary Examiner* — Ajay Cattungal
(74) *Attorney, Agent, or Firm* — Michael Best & Friedrich LLP

(57) ABSTRACT

An embodiment of the invention provides a method and apparatus for partitioning an electronic fence, relating to the technical field of computers. The method in the embodiment of the invention comprises: partitioning a coordinate system of a planimetric map, and taking one vertex of each partition in the same direction as a base point; generalizing, according to a predetermined rule, a station to the base point corresponding to the partition where the station is located; mapping, according to the predetermined rule, a vehicle position to the base point corresponding to the partition where the vehicle position is located, wherein all the stations included in the base point are stations where a vehicle may appear; and acquiring electronic fence information of the stations where the vehicle may appear, and comparing vehicle position information with the electronic fence information of the stations where the vehicle may appear so as to (Continued)

determine whether the vehicle enters or leaves the stations. In the embodiment of the invention, by partitioning the coordinate system of the planimetric map, and comparing the vehicle position information with the electronic fence information of the stations where the vehicle may appear, time complexity of a determination program is reduced, and occupation of hard disk read resources is reduced at the same time.

9 Claims, 4 Drawing Sheets

(51) Int. Cl.
  *G06F 16/29* (2019.01)
  *G08G 1/13* (2006.01)
  *G08G 1/00* (2006.01)

(56) References Cited

U.S. PATENT DOCUMENTS

2003/0028312 A1* 2/2003 Matsuoka .......... G08G 1/09675
  701/117
2005/0149262 A1* 7/2005 Oikubo .............. G01C 21/3658
  340/995.19
2019/0271550 A1* 9/2019 Breed .............. G08G 1/096725

FOREIGN PATENT DOCUMENTS

| CN | 104053127 A | 9/2014 | |
| CN | 104931991 A | 9/2015 | |
| EP | 1999434 B1 * | 10/2012 | ........... G01C 21/367 |
| WO | 2016/061283 A1 | 4/2016 | |

* cited by examiner

METHOD AND APPARATUS FOR PARTITIONING ELECTRONIC FENCE

CROSS-REFERENCE TO RELATED APPLICATION(S)

This is a U.S. national stage entry of International Patent Application No. PCT/CN2018/082425, filed on Apr. 10, 2018, which claims priority to Chinese Patent Application No. 201710761781.X, filed on Aug. 30, 2017, the entire contents of each of which are fully incorporated herein by reference.

TECHNICAL FIELD

The invention relates to the field of computers, and in particular to a method and an apparatus for partitioning an electronic fence.

BACKGROUND ART

With the development of the Internet era, the transportation business of various companies has also expanded rapidly. By taking JD Transportation as an example, from the beginning, there were only trunk line transportations of seven major districts, to the present, the number of large and small stations for branch, transmission station, and ferry transportations has grown to tens of thousands, and with the expansion of business, the layout of the stations is becoming denser and denser, and the number of stations is also more and more. To cover the national or worldwide distribution, hundreds of thousands or even millions of stations are needed, and the amount of data is huge.

In the prior art, when it is determined whether a vehicle enters or leaves a station, the vehicle is required to upload real-time GPS (Global Positioning System) coordinates, and then a server program determines whether the vehicle has entered or left the station, or it has crossed a station. In terms of specific implementation, there are two approaches. The first approach is as follows: comparing the GPS coordinates of the vehicle with electronic fence information of each station to determine whether the vehicle enters or leaves a certain electronic fence. The second approach is as follows: partitioning the stations (by area or province), first mapping the GPS coordinates of the vehicle to the city, and then traversing all the electronic fences in the city to determine whether the vehicle enters or leaves a certain electronic fence.

In the process of implementing the invention, the inventor finds at least the following problems existing in the prior art:

(1) If there is too much electronic fence information of the stations, the complexity of each traversal is O(n) (for representing the time complexity and space complexity of the algorithm), which consumes a lot of time of the Central Processing Unit (CPU).

(2) Because the electronic fence information of the stations is stored in a cache or database, the access to the electronic fence information of the stations at a high frequency will occupy a lot of hard disk read resources.

(3) For the second approach, it is required to determine in which province or city the GPS coordinates of the vehicle are located, which will bring additional consumption of third-party interfaces.

(4) For the second approach, the division of each province and city is too rigid, and the number of the stations covered by each area is not scalable.

SUMMARY OF THE INVENTION

In view of this, an embodiment of the invention provides a method and an apparatus for partitioning an electronic fence. In the embodiment of the invention, a coordinate system of a planimetric map is partitioned, a station and a vehicle position are mapped to base points corresponding to partitions where the station and the vehicle position are located according to the same rule, respectively, stations where a vehicle may appear are determined through the base point, and then vehicle position information is compared with electronic fence information of the stations where the vehicle may appear so as to determine entering or leaving of the vehicle. By means of the above method, time complexity of a determination program is reduced, and occupation of hard disk read resources is reduced at the same time.

In order to achieve the above object, according to one aspect of the embodiment of the invention, a method for partitioning an electronic fence is provided.

A method for partitioning an electronic fence according to the embodiment of the invention, comprises: partitioning a coordinate system of a planimetric map, and taking one vertex of each partition in the same direction as a base point; generalizing, according to a predetermined rule, a station to the base point corresponding to the partition where the station is located; mapping, according to the predetermined rule, a vehicle position to the base point corresponding to the partition where the vehicle position is located, wherein all the stations included in the base point are stations where a vehicle may appear; and acquiring electronic fence information of the stations where the vehicle may appear, and comparing vehicle position information with the electronic fence information of the stations where the vehicle may appear so as to determine whether the vehicle enters or leaves the stations.

Optionally, the base point is a vertex of an upper right corner of the partition; a horizontal coordinate of the coordinate system is a longitude, and a vertical coordinate thereof is a latitude; and the predetermined rule is a rule where the longitude increases and the latitude increases.

Optionally, generalizing, according to a predetermined rule, a station to the base point corresponding to the partition where the station is located, comprises: using a function $f(x,y)$ to convert, according to the predetermined rule, all coordinates in each of the partitions into base point coordinates corresponding to the partitions, wherein all coordinates of a common edge of two adjacent partitions are converted into base point coordinates corresponding to the two partitions, where x is the longitude, and y is the latitude; mapping the electronic fence information of the station to the base point corresponding to the partition where the station is located via the function $f(x,y)$; and storing the base point coordinates and the electronic fence information of all the stations included in the base point.

Optionally, storing the base point coordinates and the electronic fence information of all the stations included in the base point comprises: using the base point coordinates as a key, and using the electronic fence information of all the stations included in the base point as a value for storage in a server.

Optionally, mapping, according to the predetermined rule, a vehicle position to the base point corresponding to the partition where the vehicle position is located comprises: mapping the vehicle position to the base point corresponding to the partition where the vehicle position is located via the function $f(x,y)$.

Optionally, partitioning a coordinate system of a planimetric map comprises: partitioning each of the partitions again when the total number of the stations in the partition exceeds a preset number of times of the number of the base points.

Optionally, partitioning a coordinate system of a planimetric map comprises: evenly partitioning the corresponding partition into four pieces when the total number of the stations in the partition exceeds four times of the number of the base points.

In order to achieve the above object, according to another aspect of the embodiment of the invention, an apparatus for partitioning an electronic fence is provided.

An apparatus for partitioning an electronic fence according to the embodiment of the invention, comprises: a coordinate system partitioning unit for partitioning a coordinate system of a planimetric map, and taking one vertex of each partition in the same direction as a base point; a station generalizing unit for generalizing, according to a predetermined rule, a station to the base point corresponding to the partition where the station is located; a vehicle position mapping unit for mapping, according to the predetermined rule, a vehicle position to the base point corresponding to the partition where the vehicle position is located, wherein all the stations included in the base point are stations where a vehicle may appear; and a determining unit for acquiring electronic fence information of the stations where the vehicle may appear, and comparing vehicle position information with the electronic fence information of the stations where the vehicle may appear so as to determine whether the vehicle enters or leaves the stations.

Optionally, the base point is a vertex of an upper right corner of the partition; a horizontal coordinate of the coordinate system is a longitude, and a vertical coordinate thereof is a latitude; and the predetermined rule is a rule where the longitude increases and the latitude increases.

Optionally, the station generalizing unit is further used for using a function f(x,y) to convert, according to the predetermined rule, all coordinates in each of the partitions into base point coordinates corresponding to the partitions, wherein all coordinates of a common edge of two adjacent partitions are converted into base point coordinates corresponding to the two partitions, where x is the longitude, and y is the latitude; mapping the electronic fence information of the station to the base point corresponding to the partition where the station is located via the function f(x,y); and storing the base point coordinates and the electronic fence information of all the stations included in the base point.

Optionally, the station generalizing unit is further used for using the base point coordinates as a key, and using the electronic fence information of all the stations included in the base point as values for storage in a server.

Optionally, the vehicle position mapping unit is further used for mapping the vehicle position to the base point corresponding to the partition where the vehicle position is located via the function f(x,y).

Optionally, the coordinate system partitioning unit is further used for partitioning each of the partitions again when the total number of the stations in the partition exceeds a preset number of times of the number of the base points.

Optionally, the coordinate system partitioning unit is further used for evenly partitioning the corresponding partition into four pieces when the total number of the stations in the partition exceeds four times of the number of the base points.

In order to achieve the above object, according to a further aspect of the embodiment of the invention, an electronic device is provided.

An electronic device according to the embodiment of the invention, comprises: one or more processors; and a memory for storing one or more programs, wherein the one or more programs, when executed by the one or more processors, cause the one or more processors to implement the method according to the embodiment of the invention.

In order to achieve the above object, according to a further aspect of the embodiment of the invention, a computer-readable medium is provided.

A computer-readable medium according to the embodiment of the invention has a computer program stored thereon, wherein the program, when executed by a processor, implements a method for partitioning an electronic fence according to the embodiment of the invention.

The above one embodiment in the invention has the following advantages or beneficial effects: the determination of entering or leaving of the vehicle by partitioning the coordinate system, mapping the station and the vehicle position to the base points corresponding to the partitions where the station and the vehicle position are located, and then comparing the vehicle position information with the electronic fence information of the stations where the vehicle may appear reduces calculation time by which the entering or leaving of the vehicle is determined, and reduces time complexity of a determination program from approaching O(n) to approaching O(1); in the embodiment of the invention, it is only required to compare the vehicle position information with the electronic fence information of the stations where the vehicle may appear without acquiring a full amount of data by accessing a cache server or a database server through a network at a high frequency, whereby occupation of hard disk read resources is reduced; dynamic partitioning is performed, where each of the partitions is partitioned again when the total number of the stations in the partition exceeds a preset number of times of the number of the base points, which solves the problem of a low hash efficiency caused by uneven station distribution, and gives consideration to both the efficiency and the accuracy of the determination.

Further effects of the above non-conventional optional manners will be described below in combination with specific implementation modes.

BRIEF DESCRIPTION OF THE DRAWINGS

Figures are used for better understanding of the invention, and do not form improper limitations of the invention. Wherein.

DETAILED DESCRIPTION

Exemplary embodiments of the invention, including various details of the embodiment of the invention, are described below by taking the figures into consideration to facilitate understanding, and they shall be considered as exemplary ones only. Thus, those skilled in the art should recognize that various changes and modifications may be made to the embodiments described herein without departing from the scope and spirit of the invention. Similarly, for clarity and conciseness, descriptions of well-known functions and structures are omitted in the descriptions below.

The electronic fence in the embodiment of the invention refers to a coverage area of stations circled on a map. The electronic fence is generally a circular area, and may be also a square area, a polygonal area, and the like. The stations include distribution stations and sorting centers. The method for partitioning an electronic fence according to the embodiment of the invention has already been tried out in the JD transportation platform, and the effect is remarkable.

Figure 1:
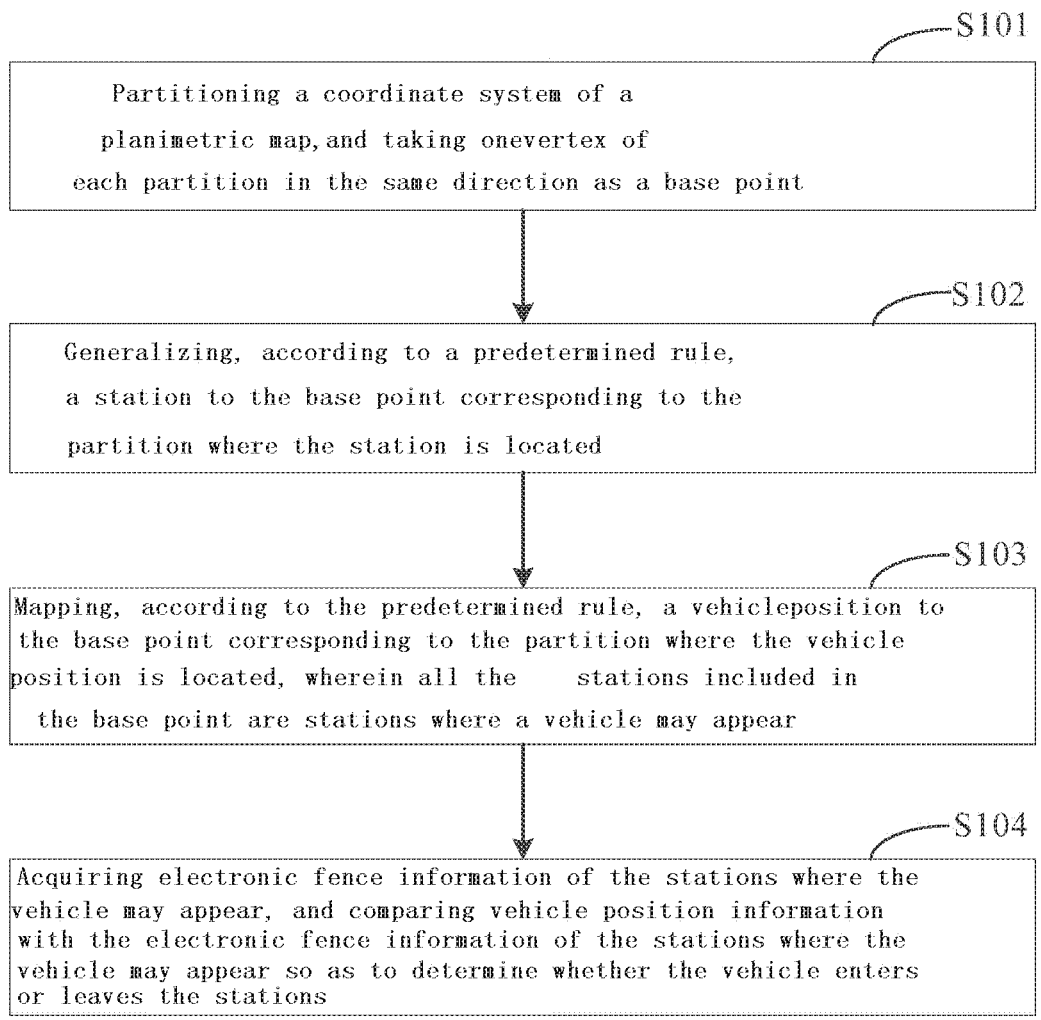
FIG. 1 is a schematic diagram of main steps of a method for partitioning an electronic fence according to an embodiment of the invention.

FIG. 1 is a schematic diagram of main steps of a method for partitioning an electronic fence according to an embodiment of the invention. As shown in FIG. 1, the method for partitioning an electronic fence according to the embodiment of the invention mainly comprises the following steps:

Step S101: Partitioning a coordinate system of a planimetric map, and taking one vertex of each partition in the same direction as a base point. The coordinate system is partitioned, the partition is used for gathering scattered stations together for storage, and the shape and size of each partition may be customized. In the embodiment of the invention, the horizontal and vertical coordinates of the coordinate system are a longitude and a latitude, respectively. The coordinate system is evenly partitioned into rectangular pieces in the horizontal and vertical directions, and the vertex of the upper right corner of the rectangular piece is used as a base point.

Step S102: Generalizing, according to a predetermined rule, a station to the base point corresponding to the partition where the station is located. As long as the electronic fence of the station overlaps with the partition corresponding to the base point, the station will be received and stored by the base point. In the embodiment of the invention, the predetermined rule is a rule where the longitude increases and the latitude increases, and the irregular station distribution is mapped to the base point according to the rule, and the mapped station distribution is stored by a key-value server. The "key" is the coordinates of each base point, and the "value" is the electronic fence information of all the stations included in the base point. The electronic fence information includes the center coordinates of the electronic fence, the service code and name of the electronic fence, and the like.

Step S103: Mapping, according to the predetermined rule, a vehicle position to the base point corresponding to the partition where the vehicle position is located, wherein all the stations included in the base point are stations where a vehicle may appear. A rule the same as that for station partitioning is used to map the vehicle position, and the vehicle position will be also mapped to the base point. Then, the vehicle may be only in the electronic fence of the stations included in the base point.

Step S104: Acquiring electronic fence information of the stations where the vehicle may appear, and comparing vehicle position information with the electronic fence information of the stations where the vehicle may appear so as to determine whether the vehicle enters or leaves the stations. The embodiment of the invention is only required to acquire the electronic fence information of the stations where the vehicle may appear, which reduces the pressure brought by acquiring the electronic fence information of all the stations on the database server and the cache server, and also saves network transmission resources. By comparing the vehicle position information with the electronic fence information of the stations where the vehicle may appear, the scope of the determination of the stations is reasonably reduced. When the number of the stations in the partition is appropriate, the time complexity of the program for determining whether the vehicle enters or leaves the electronic fence of the stations almost reaches a constant level. The vehicle position information is positioning information of the vehicle at any position, for example, it may be the GPS coordinates of the vehicle.

The specific implementation process of generalizing, according to a predetermined rule, a station to the base point corresponding to the partition where the station is located in step S102 comprises:

Step S1021: Using a function f(x,y) to convert, according to the predetermined rule, all coordinates in each of the partitions into base point coordinates corresponding to the partitions, wherein all coordinates of a common edge of two adjacent partitions are converted into base point coordinates corresponding to the two partitions, where x is the longitude, and y is the latitude. In this step, a point is used in place of a surface, the number of the coordinates that may be included in one partition is indefinite, and after all of the coordinates of the partition are calculated by the function f(x,y), an infinite number of coordinates are converted into coordinates of one base point.

Step S1022: Mapping the electronic fence information of the station to the base point corresponding to the partition where the station is located via the function f(x,y). In the embodiment of the invention, the electronic fence of the station is a circular area, and the coordinates of the center of the station are mapped to the base point corresponding to the partition where the station is located via the function f(x,y), whereby it is found to which base point the coordinates of the center of the station belong.

Step S1023: Storing the base point coordinates and the electronic fence information of all the stations included in the base point. After the stations are mapped to the base point, the base point coordinates and the electronic fence information of all the stations included in the base point are stored in the form of key-value.

The specific implementation process of step S103 comprises: mapping the vehicle position to the base point corresponding to the partition where the vehicle position is located via the function f(x,y). The vehicle may be only in the electronic fence included in the base point.

In addition, in step S101, when a coordinate system of a planimetric map is partitioned, dynamic partitioning may be performed, which specifically comprises: partitioning each of the partitions again when the total number of the stations in the partition exceeds a preset number of times of the number of the base points. When the number of the stations gradually increases, the stations in one partition will become too dense, and after mapping by the function f(x,y), the number of the stations corresponding to one base point will be too high, i.e., one "key" corresponds to too many "values". Then, there are too many "values" that are found using the "key". The ideal hash is one-to-one. Traversing is required to find the "value", which will reduce the hash efficiency and lose the advantage of the algorithm. Thus, the method for partitioning an electronic fence according to the embodiment of the invention adopts a dynamic partitioning manner, where all the stations are re-partitioned to make the numbers of the stations in the partitions be more balanced. In the embodiment of the invention, it is set that when the total number of the stations in the partition exceeds 4 times of the number of the base points, re-partitioning and re-planning are performed by doubling the transverse and vertical partitioning densities of the coordinate system, respectively, i.e., evenly partitioning the original one partition into four pieces. The preset number of times and the number of the re-partitions herein may be customized. In the embodiment, when the total number of the stations exceeds 4 times of the number of the base points, one partition is partitioned again into four pieces in order to distribute the stations to the base points relatively evenly, and reduce the calculation complexity.

Taking that the total number of the stations exceeds 4 times of the number of the base points as an example, detailed descriptions are given below:

In the initial state, the entire map is one partition, and one partition corresponds to one base point, which is just the upper right vertex of the partition.

When the number of the stations exceeds 4 (that is, when the 5th station is added), the number of stations exceeds 4 times of the number of the base points (5>1*4), and at this time, one partition of the entire map should be partitioned into 4 pieces, and 4 partitions correspond to 4 base points.

When the number of the stations exceeds 16 (that is, when the 17th station is added), the number of the stations further exceeds 4 times of the number of the base points (17>4*4), and at this time, repartitioning is further required, and 4 partitions are partitioned into 16 pieces.

By analogy, whenever the number of the stations reaches 4n+1 (n is a positive integer), repartitioning will be performed.

Figure 2:
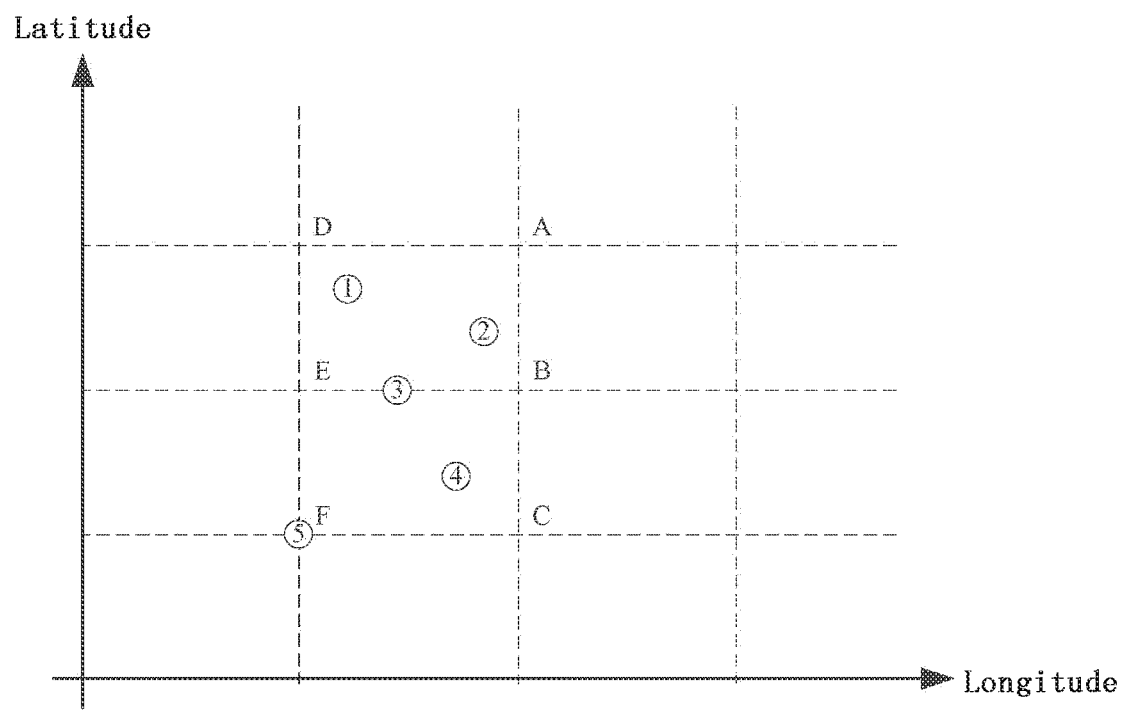
FIG. 2 is a schematic diagram of station positions when no partitioning is performed according to the embodiment of the invention.

FIG. 2 is a schematic diagram of station positions when no partitioning is performed according to the embodiment of the invention. As shown in FIG. 2, the horizontal coordinate is a longitude, and the vertical coordinate is a latitude. The coordinate system is partitioned with dotted lines, and A, B, C, D, E and F positions are the intersection points of the horizontal and vertical dotted lines, which are called base points; the black circles are the electronic fences of the stations, and 1 to 5 are used in the figure to represent 5 stations. In the figure, the station 3 is on on a horizontal dotted line, and the station 5 is on the intersection point of the horizontal and vertical dotted lines.

Figure 3:
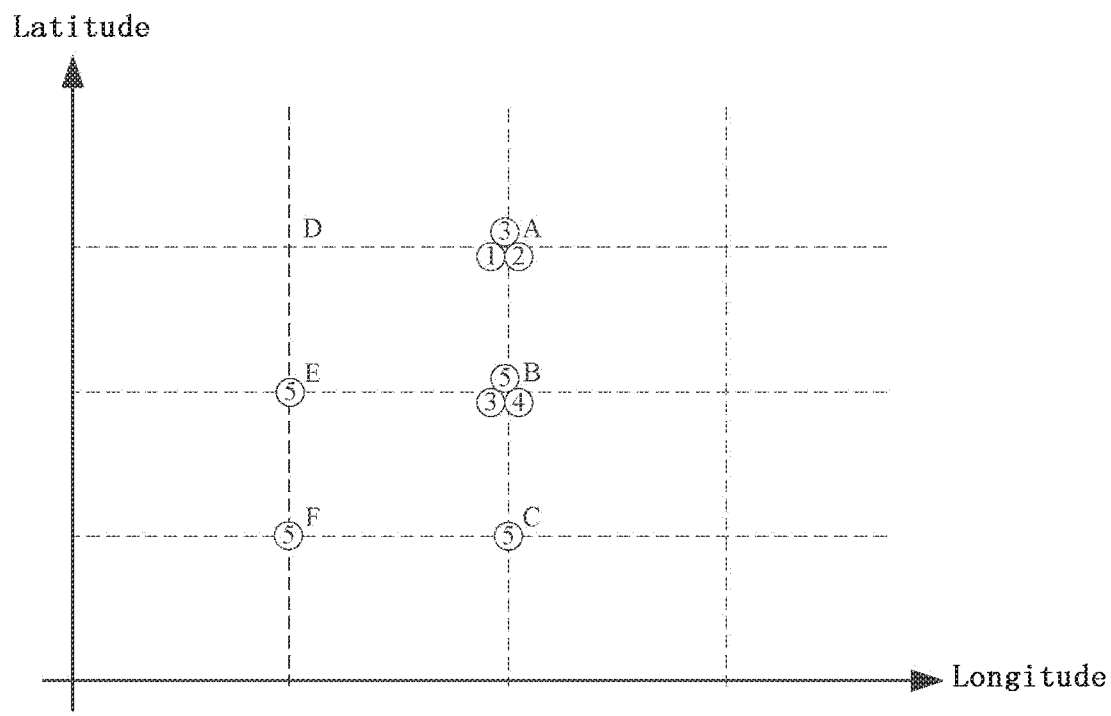
FIG. 3 is a schematic diagram of station positions after partitioning is performed according to the embodiment of the invention.

FIG. 3 is a schematic diagram of station positions after partitioning is performed according to the embodiment of the invention. As shown in FIG. 3, according to the rule where the longitude increases and the latitude increases (i.e., the horizontal coordinate increases and the vertical coordinate increases), the random stations 1 to 5 in the coordinate system are generalized to the base points A to F. In the figure, if the electronic fence of the station 1 overlaps with the partition corresponding to the base point A, the station 1 is generalized to the base point A; if the electronic fence of the station 2 overlaps with the partition corresponding to the base point A, the station 2 is also generalized to the base point A; if the electronic fence of the station 4 overlaps with the partition corresponding to the base point B, the station 4 is generalized to the base point B; if the electronic fence of the station 3 overlaps with the two partitions corresponding to the base point A and the base point B, the two base points will receive the electronic fence information of the station 3; if the electronic fence of the station 5 overlaps with the four partitions corresponding to the base point B, the base point C, the base point E, and the base point F, the four base points will receive the electronic fence information of the station 5.

Figure 4:
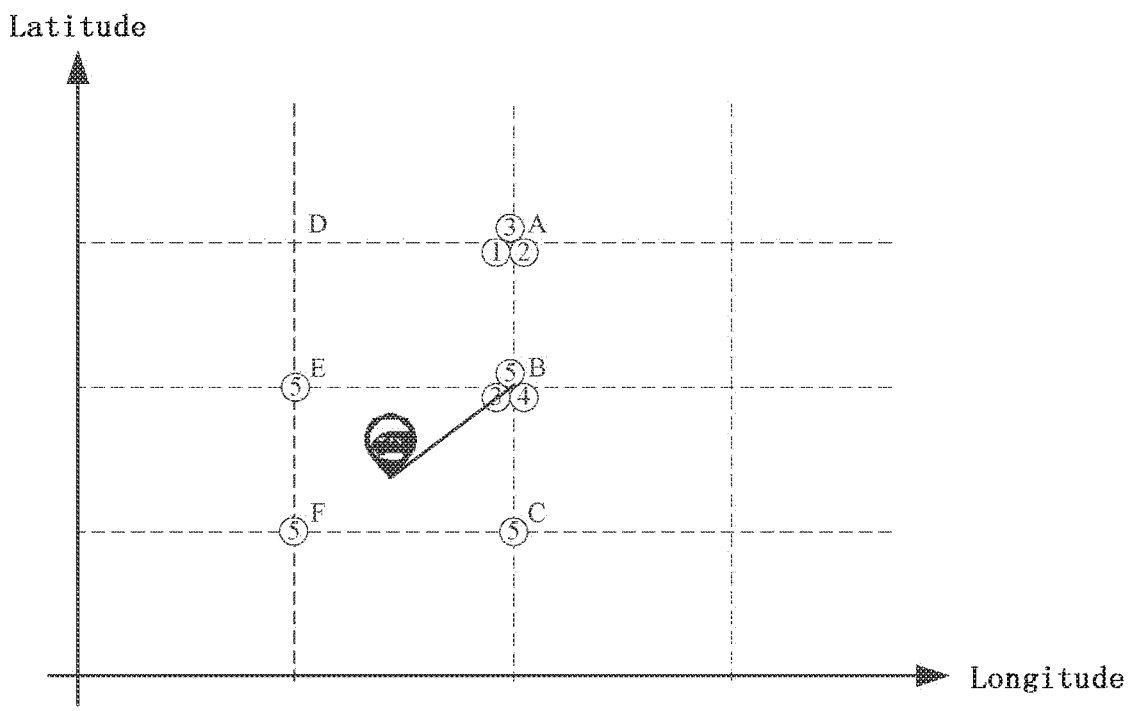
FIG. 4 is a schematic diagram of mapping of a vehicle position according to the embodiment of the invention.

FIG. 4 is a schematic diagram of mapping of a vehicle position according to the embodiment of the invention. As shown in FIG. 4, a rule the same as that for station partitioning, i.e., the longitude increases and the latitude increases, is used to map the vehicle position to the base point. After the GPS coordinates of the vehicle are mapped according to the rule, they are mapped to the base point B, so the vehicle may only appear in the station 3, the station 4, and the station 5 (which may be verified in comparison with FIG. 2).

It may be seen from the method for partitioning an electronic fence according to the embodiment of the invention that the determination of entering or leaving of the vehicle by partitioning the coordinate system, mapping the station and the vehicle position to the base points corresponding to the partitions where the station and the vehicle position are located, and then comparing the vehicle position information with the electronic fence information of the stations where the vehicle may appear reduces calculation time by which the entering or leaving of the vehicle is determined, and reduces time complexity of a determination program from approaching O(n) to approaching O(1); in the embodiment of the invention, it is only required to compare the vehicle position information with the electronic fence information of the stations where the vehicle may appear without acquiring a full amount of data by accessing a cache server or a database server through a network at a high frequency, whereby occupation of hard disk read resources is reduced; dynamic partitioning is performed, where each of the partitions is partitioned again when the total number of the stations in the partition exceeds a preset number of times of the number of the base points, which solves the problem of a low hash efficiency caused by uneven station distribution, and gives consideration to both the efficiency and the accuracy of the determination.

Figure 5:
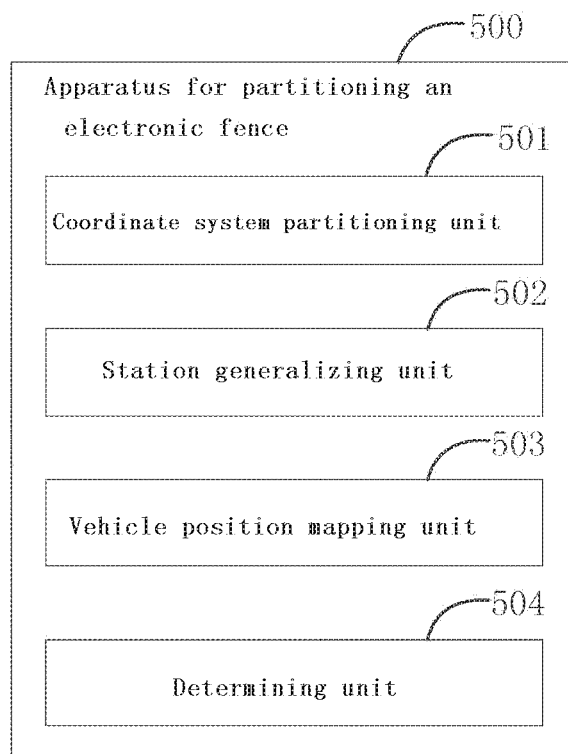
FIG. 5 is a schematic diagram of main units of an apparatus for partitioning an electronic fence according to the embodiment of the invention.

FIG. 5 is a schematic diagram of main units of an apparatus for partitioning an electronic fence according to the embodiment of the invention. As shown in FIG. 5, the apparatus for partitioning an electronic fence according to the embodiment of the invention comprises:

A coordinate system partitioning unit 501 is for partitioning a coordinate system of a planimetric map, and taking one vertex of each partition in the same direction as a base point. The coordinate system is partitioned, the partition is used for gathering scattered stations together for storage, and the shape and size of each partition may be customized. When the number of the stations gradually increases, the stations in one partition will become too dense. After mapping by the function f(x,y), the number of the stations corresponding to one base point will be too high. Thus, the coordinate system partitioning unit 501 according to the embodiment of the invention adopts a dynamic partitioning manner, in which each of the partitions is partitioned again when the total number of the stations in the partition exceeds a preset number of times of the number of the base points.

A station generalizing unit 502 is for generalizing, according to a predetermined rule, a station to the base point corresponding to the partition where the station is located.

As long as the electronic fence of the station overlaps with the partition corresponding to the base point, the station will be received and stored by the base point.

A vehicle position mapping unit 503 is for mapping, according to the predetermined rule, a vehicle position to the base point corresponding to the partition where the vehicle position is located, wherein all the stations included in the base point are stations where a vehicle may appear. A rule the same as that for station partitioning is used to map the vehicle position, and the vehicle position will be also mapped to the base point. Then, the vehicle may be only in the electronic fence of the stations included in the base point.

A determining unit 504 is for acquiring electronic fence information of the stations where the vehicle may appear, and comparing vehicle position information with the electronic fence information of the stations where the vehicle may appear so as to determine whether the vehicle enters or leaves the stations. By comparing the vehicle position information with the electronic fence information of the stations where the vehicle may appear, the scope of the determination of the stations is reasonably reduced.

It may be seen from the above descriptions that the determination of entering or leaving of the vehicle by partitioning the coordinate system, mapping the station and the vehicle position to the base points corresponding to the partitions where the station and the vehicle position are located, and then comparing the vehicle position information with the electronic fence information of the stations where the vehicle may appear reduces calculation time by which the entering or leaving of the vehicle is determined is reduced, and reduces time complexity of a determination program from approaching O(n) to approaching O(1); in the embodiment of the invention, it is only required to compare the vehicle position information with the electronic fence information of the stations where the vehicle may appear without acquiring a full amount of data by accessing a cache server or a database server through a network at a high frequency, whereby occupation of hard disk read resources is reduced; dynamic partitioning is performed, where each of the partitions is partitioned again when the total number of the stations in the partition exceeds a preset number of times of the number of the base points, which solves the problem of a low hash efficiency caused by uneven station distribution, and gives consideration to both the efficiency and the accuracy of the determination.

Figure 6:
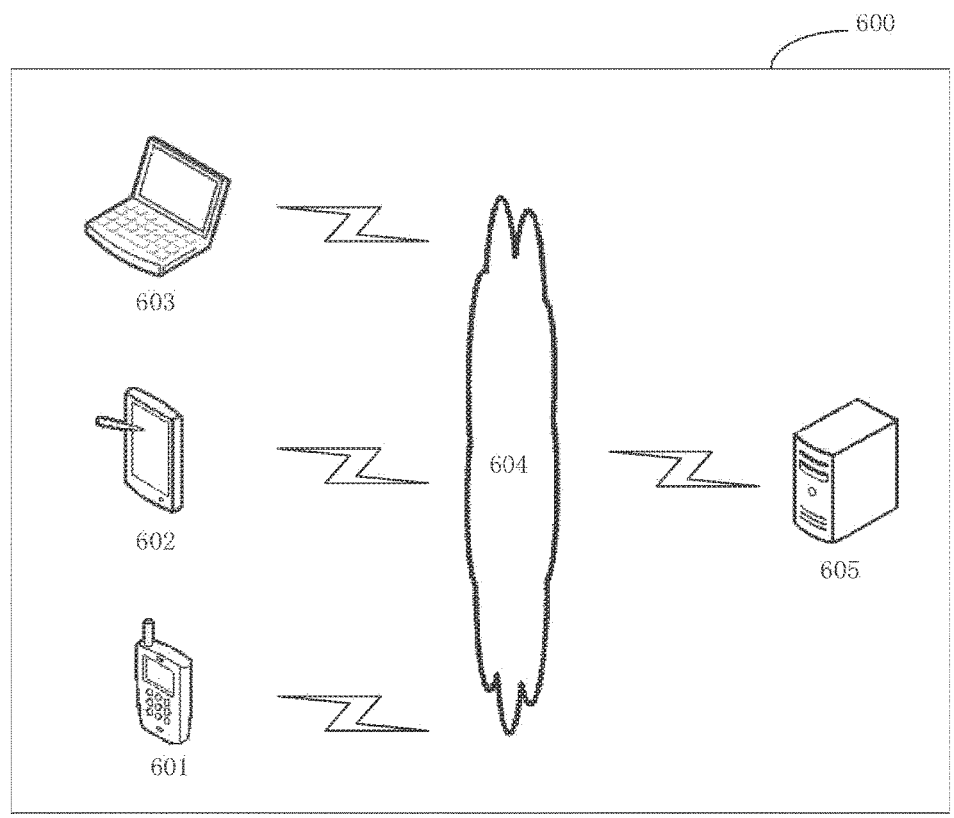
FIG. 6 is an exemplary system architecture diagram in which the embodiment of the invention may be applied.

FIG. 6 shows an exemplary system architecture 600 in which the method for partitioning an electronic fence or the apparatus for partitioning an electronic fence according to the embodiment of the invention may be applied.

As shown in FIG. 6, the system architecture 600 may comprise terminal devices 601, 602, 603, a network 604 and a sever 605. The network 604 is used to provide a medium for a communication link between the terminal devices 601, 602, 603 and the server 605. The network 604 may include various connection types, such as wired, wireless communication links, or fiber optic cables, and the like.

Users may use the terminal devices 601, 602, 603 to interact with the server 605 through the network 604 to receive or send messages and the like. Various communication client applications may be installed on the terminal devices 601, 602, and 603, such as shopping applications, web browser applications, search applications, instant messaging tools, email clients, social platform software, and the like (only for examples).

The terminal devices 601, 602, 603 may be various electronic devices having display screens and supporting web browsing, including but not limited to smart phones, tablet computers, laptop computers, and desktop computers.

The server 605 may be a server that provides various services, for example, a background management server that provides support for a shopping website browsed by a user using the terminal devices 601, 602, 603 (only for examples). The background management server may process, e.g., analyze, the received product information query request and other data, and feed the processing results (such as target push information and product information, only for examples) back to the terminal devices.

It should be noted that the method for partitioning an electronic fence provided by the embodiment of the present application is generally performed by the server 605, and correspondingly, the apparatus for partitioning an electronic fence is generally provided in the server 605.

It should be understood that the numbers of the terminal devices, the networks, and the servers in FIG. 6 are only schematic. According to implementation requirements, there may be any numbers of the terminal devices, the networks, and the servers.

According to the embodiment of the invention, the invention further provides an electronic device and a computer-readable medium.

The electronic device according to the invention comprises: one or more processors; and a storage means for storing one or more programs, wherein the one or more programs, when executed by the one or more processors, cause the one or more processors to implement a method for partitioning an electronic fence according to the embodiment of the invention.

The computer-readable medium according to the invention has a computer program stored thereon, wherein the program, when executed by a processor, implements a method for partitioning an electronic fence according to the embodiment of the invention.

Figure 7:
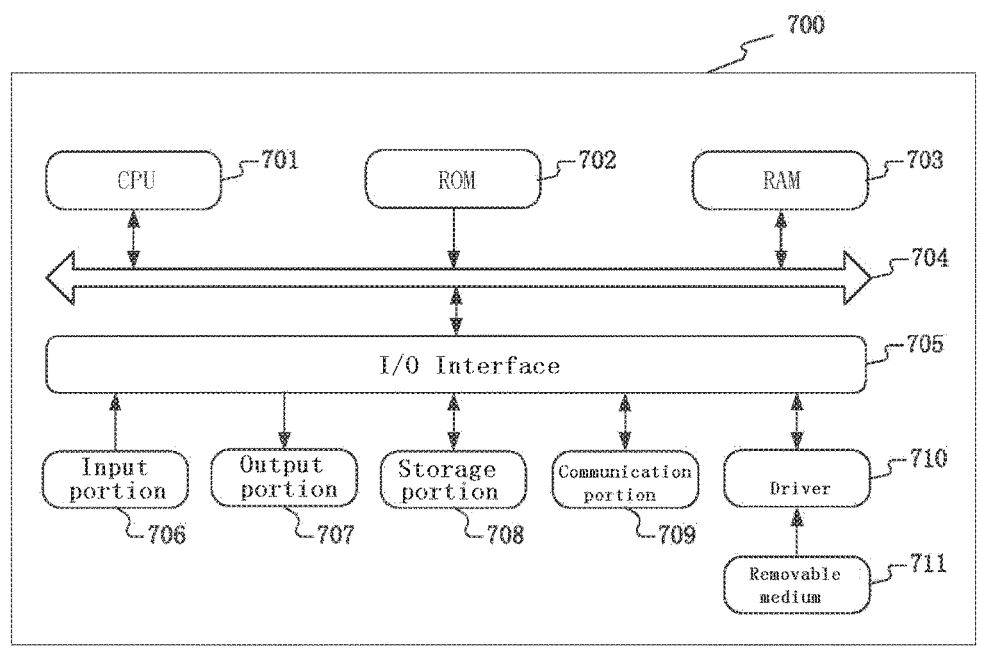
FIG. 7 is a structural schematic diagram of a computer device suitable for implementing an electronic device according to the embodiment of the invention.

Reference is now made to FIG. 7, which shows a structural schematic diagram of a computer system 700 suitable for implementing an electronic device according to the embodiment of the invention. The electronic device shown in FIG. 7 is only an example, and shall not impose any limitation on the function and scope of use of the embodiment of the invention.

As shown in FIG. 7, the computer system 700 comprises a central processing unit (CPU) 701, which may perform various appropriate actions and treatments in accordance with a program stored in a read-only memory (ROM) 702 or a program loaded from a storage section 708 into a random access memory (RAM) 703. Various programs and data required for the operation of the computer system 700 are also stored in the RAM 703. The CPU 701, the ROM 702, and the RAM 703 are connected to each other through a bus 704. An input/output (I/O) interface 705 is also connected to the bus 704.

The following components are connected to the I/O interface 705: an input portion 706 including a keyboard, a mouse, and the like; an output portion 707 including a cathode ray tube (CRT), a liquid crystal display (LCD), a speaker, and the like; a storage portion 708 including a hard disk and the like; and a communication portion 709 including a network interface card such as a LAN card, a modem, and the like. The communication portion 709 performs communication processing via a network such as the Internet. A driver 710 is also connected to the I/O interface 705 according to requirements. A removable medium 711, such as a magnetic disk, an optical disk, a magneto-optical disk, a semiconductor memory, and the like, is installed on the drive 710 according to requirements, so that a computer program read out therefrom is installed in the storage portion 708 according to requirements.

In particular, according to the embodiment disclosed in the invention, the process described in the figure of the main steps above may be implemented as a computer software program. For example, the embodiment disclosed in the invention includes a computer program product, which includes a computer program carried on a computer-readable medium, the computer program containing a program code for performing the method shown in the figure of the main steps. In such embodiment, the computer program may be downloaded and installed from a network through the communication portion 709, and/or installed from the removable medium 711. When the computer program is executed by the central processing unit (CPU) 701, the above functions defined in the system of the invention are performed.

It should be noted that the computer-readable medium shown in the invention may be a computer-readable signal medium or a computer-readable storage medium or any combination thereof. The computer-readable storage medium may be, for example, but not limited to, an electronic, magnetic, optical, electromagnetic, infrared, or semiconductor system, apparatus, or device, or any combination thereof. More specific examples of the computer-readable storage medium may include, but are not limited to: an electrical connection with one or more wires, a portable computer disk, a hard disk, a random access memory (RAM), a read-only memory (ROM), an erasable programming read-only memory (EPROM or flash memory), an optical fiber, a portable compact disk read-only memory (CD-ROM), an optical storage device, a magnetic storage device, or any suitable combination thereof. In the invention, the computer-readable storage medium may be any tangible medium containing or storing a program, and the program may be used by or in combination with an instruction execution system, apparatus, or device. In the invention, the computer-readable signal medium may comprise a data signal propagated in a baseband or as a part of a carrier wave, in which a computer-readable program code is carried. Such propagated data signal may adopt many forms, including but not limited to electromagnetic signals, optical signals, or any suitable combination thereof. The computer-readable signal medium may be also any computer-readable medium other than a computer-readable storage medium, and the computer-readable medium may send, propagate, or transmit a program for use by or in connection with an instruction execution system, apparatus, or device. The program code included on the computer-readable medium may be transmitted using any appropriate medium, including but not limited to: wireless, wire, optical cable, RF, and the like, or any suitable combination thereof.

The flowcharts and block diagrams in the figures illustrate the system architectures, functions, and operations that may be implemented by systems, methods and computer program products according to various embodiments of the invention. In this regard, each block in the flowcharts or block diagrams may represent one unit, one program segment, or a part of a code, which contains one or more executable instructions for implementing the prescribed logic functions. It should be also noted that in some alternative implementations, the functions marked in the blocks may also occur in an order different from that marked in the figures. For example, two blocks represented one after the other may actually be executed substantially in parallel, and they may sometimes be executed in the reverse order, which depends on the functions involved. It should be also noted that each block in the block diagrams or flowcharts, and combinations of the blocks in the block diagrams or flowcharts may be implemented by a dedicated hardware-based system that performs the prescribed functions or operations, or may be implemented by a combination of dedicated hardware and computer instructions.

The involved units described in the embodiment of the invention may be implemented by software or hardware. The described units may be also provided in a processor, and may be described, for example, as follows: a processor comprising a coordinate system partitioning unit, a station generalizing unit, a vehicle position mapping unit, and a determining unit. The names of these units do not form limitations on the units themselves in some cases. For example, the coordinate system partitioning unit may be also described as "a unit for partitioning a coordinate system of a planimetric map, and taking one vertex of each partition in the same direction as a base point".

As another aspect, the invention further provides a computer-readable medium, which may be included in the device described in the above embodiment; or may exist independently without being assembled into the device. The above computer-readable medium carries one or more programs, which, when executed by one of the devices, cause the device to comprise: partitioning a coordinate system of a planimetric map, and taking one vertex of each partition in the same direction as a base point; generalizing, according to a predetermined rule, a station to the base point corresponding to the partition where the station is located; mapping, according to the predetermined rule, a vehicle position to the base point corresponding to the partition where the vehicle position is located, wherein all the stations included in the base point are stations where a vehicle may appear; and acquiring electronic fence information of the stations where the vehicle may appear, and comparing vehicle position information with the electronic fence information of the stations where the vehicle may appear so as to determine whether the vehicle enters or leaves the stations.

It may be seen from the above descriptions that the determination of entering or leaving of the vehicle by partitioning the coordinate system, mapping the station and the vehicle position to the base points corresponding to the partitions where the station and the vehicle position are located, and then comparing the vehicle position information with the electronic fence information of the stations where the vehicle may appear reduces calculation time by which the entering or leaving of the vehicle is determined is reduced, and reduces time complexity of a determination program from approaching O(n) to approaching O(1); in the embodiment of the invention, it is only required to compare the vehicle position information with the electronic fence information of the stations where the vehicle may appear without acquiring a full amount of data by accessing a cache server or a database server through a network at a high frequency, whereby occupation of hard disk read resources is reduced; dynamic partitioning is performed, where each of the partitions is partitioned again when the total number of the stations in the partition exceeds a preset number of times of the number of the base points, which solves the problem of a low hash efficiency caused by uneven station distribution, and gives consideration to both the efficiency and the accuracy of the determination.

The above product may perform the method provided by the embodiment of the invention, and has corresponding functional modules for performing the method and beneficial effects. For technical details not described in detail in the embodiment, reference may be made to the method provided in the embodiment of the invention.

The above specific implementation modes do not form limitations on the scope of protection of the invention. It should be understood by those skilled in the art that various modifications, combinations, sub-combinations, and substitutions may occur depending on design requirements and other factors. Any modifications, equivalent substitutions, improvements, and the like made within the spirit and principle of the invention shall be included in the scope of protection of the invention.

The invention claimed is:

1. A method for partitioning an electronic fence, comprising:
   partitioning a coordinate system of a planimetric map, and taking one vertex of each partition in the same direction as a base point;
   generalizing, according to a predetermined rule, a station to the base point corresponding to the partition where the station is located;
   mapping, according to the predetermined rule, a vehicle position to the base point corresponding to the partition where the vehicle position is located, all the stations included in the base point are stations where a vehicle may appear; and
   acquiring electronic fence information of the stations where the vehicle may appear, and comparing vehicle position information with the electronic fence information of the stations where the vehicle may appear so as to determine whether the vehicle enters or leaves the stations.

2. The method according to claim 1, wherein the base point is a vertex of an upper right corner of the partition; a horizontal coordinate of the coordinate system is a longitude, and a vertical coordinate thereof is a latitude; and the predetermined rule is a rule where the longitude increases and the latitude increases.

3. The method according to claim 1, wherein the generalizing, according to a predetermined rule, a station to the base point corresponding to the partition where the station is located comprises:
   using a function f(x,y) to convert, according to the predetermined rule, all coordinates in each of the partitions into base point coordinates corresponding to the partitions, wherein all coordinates of a common edge of two adjacent partitions are converted into base point coordinates corresponding to the two partitions, where x is the longitude, and y is the latitude;
   mapping the electronic fence information of the station to the base point corresponding to the partition where the station is located via the function f(x,y);
   storing the base point coordinates and the electronic fence information of all the stations included in the base point.

4. The method according to claim 3, wherein the storing the base point coordinates and the electronic fence information of all the stations included in the base point comprises: using the base point coordinates as a key, and using the electronic fence information of all the stations included in the base point as a value for storage in a server.

5. The method according to claim 3, wherein the mapping, according to the predetermined rule, a vehicle position to the base point corresponding to the partition where the vehicle position is located comprises: mapping the vehicle position to the base point corresponding to the partition where the vehicle position is located via the function f(x,y).

6. The method according to claim 1, wherein the partitioning a coordinate system of a planimetric map comprises: partitioning each of the partitions again when the total number of the stations in the partition exceeds a preset number of times of the number of the base points.

7. The method according to claim 1, wherein the partitioning a coordinate system of a planimetric map comprises: evenly partitioning the corresponding partition into four pieces when the total number of the stations in the partition exceeds four times of the number of the base points.

8. An electronic device, characterized by comprising:
   one or more processors; and
   a memory for storing one or more programs,
   wherein the one or more programs, when executed by the one or more processors, cause the one or more processors to implement the method according to claim 1.

9. An apparatus for partitioning an electronic fence, comprising:
   a coordinate system partitioning unit for partitioning a coordinate system of a planimetric map, and taking one vertex of each partition in the same direction as a base point;
   a station generalizing unit for generalizing, according to a predetermined rule, a station to the base point corresponding to the partition where the station is located;
   a vehicle position mapping unit for mapping, according to the predetermined rule, a vehicle position to the base point corresponding to the partition where the vehicle position is located, all the stations included in the base point are stations where a vehicle may appear; and
   a determining unit for acquiring electronic fence information of the stations where the vehicle may appear, and comparing vehicle position information with the electronic fence information of the stations where the vehicle may appear so as to determine whether the vehicle enters or leaves the stations.

* * * * *